US012602140B2

(12) United States Patent
Kalmus

(10) Patent No.: US 12,602,140 B2
(45) Date of Patent: Apr. 14, 2026

(54) SYSTEM AND METHOD FOR CONTACT MANAGEMENT

(71) Applicant: Perry Kalmus, Beverly Hills, CA (US)

(72) Inventor: Perry Kalmus, Beverly Hills, CA (US)

( * ) Notice: Subject to any disclaimer, the term of this patent is extended or adjusted under 35 U.S.C. 154(b) by 124 days.

(21) Appl. No.: 18/375,433

(22) Filed: Sep. 29, 2023

(65) Prior Publication Data

US 2024/0192827 A1 Jun. 13, 2024

Related U.S. Application Data

(60) Provisional application No. 63/412,340, filed on Sep. 30, 2022.

(51) Int. Cl.
*G06F 3/048* (2013.01)
*G06F 3/04817* (2022.01)
*G06F 16/9535* (2019.01)

(52) U.S. Cl.
CPC ...... *G06F 3/04817* (2013.01); *G06F 16/9535* (2019.01)

(58) Field of Classification Search
CPC .......................... B06F 3/04817; G06F 16/9535
See application file for complete search history.

(56) References Cited

U.S. PATENT DOCUMENTS

| | | | | | |
|---|---|---|---|---|---|
| 2006/0236372 | A1* | 10/2006 | Dunn | ................... | G06Q 10/107 726/2 |
| 2013/0332839 | A1* | 12/2013 | Frazier | ............... | H04N 21/4756 715/738 |
| 2014/0067535 | A1* | 3/2014 | Rezaei | ................... | G06F 16/285 705/14.54 |
| 2014/0297784 | A1* | 10/2014 | Zhao | ..................... | H04L 67/306 709/217 |
| 2015/0371265 | A1* | 12/2015 | Leisher | .............. | G06Q 30/0261 705/14.55 |
| 2016/0210007 | A1* | 7/2016 | B. | .......................... | G06F 3/0484 |
| 2016/0359956 | A1* | 12/2016 | Bokestad | ................ | H04W 4/21 |
| 2017/0093777 | A1* | 3/2017 | Neustifter | ............. | H04L 67/535 |
| 2018/0032997 | A1* | 2/2018 | Gordon | .............. | G06Q 30/0269 |
| 2018/0246983 | A1* | 8/2018 | Rathod | ................. | G06F 16/972 |

(Continued)

OTHER PUBLICATIONS

Authors et al., A system and method for cross-browsers testing with shared data, 2017, IP, 2017 (Year: 2017).*

(Continued)

*Primary Examiner* — Linh K Pham

(74) *Attorney, Agent, or Firm* — Olivo IP Law Group, P.C.; John W. Olivo, Jr.

(57) ABSTRACT

A contact hub that creates cross-website access to contact lists for more efficient and personalized communication. These lists detail a contact's name, social media profiles, URLs, notes, where users met or potentially plan on meeting, annotations, as well as all pertinent contact information. Contact information is both adopted from internal and external sources and there is an option for users to scan business cards, other documents, and media in association with contacts, creating a secure hub of information regarding an individual. Contact lists are accessible throughout a plurality of applications and employ an information retrieval system that manifests through an icon, and upon being clicked, discloses an array of information and data that has been input.

12 Claims, 14 Drawing Sheets

(56) References Cited

U.S. PATENT DOCUMENTS

2018/0309801 A1 * 10/2018 Rathod ............... H04M 3/5175
2022/0377034 A1 * 11/2022 Fried ....................... H04L 67/55

OTHER PUBLICATIONS

Shinjo et al., A Distributed Web Browser as a Platform for Running
Collaborative Applications, 2011, IEEE, 9 pages. (Year: 2011).*

* cited by examiner

702

704

706

708

710

716

712

714

700

Name:
Emma Purdy

Email:

URL:
https://www.linkedin.com/in/emma-purdy-356b497/

Met:
Williams

Context:
Went to Williams together. She went to Peddie!

Notes:
Pitched her on 6/30/22 on using AKALA as an

Back     Edit

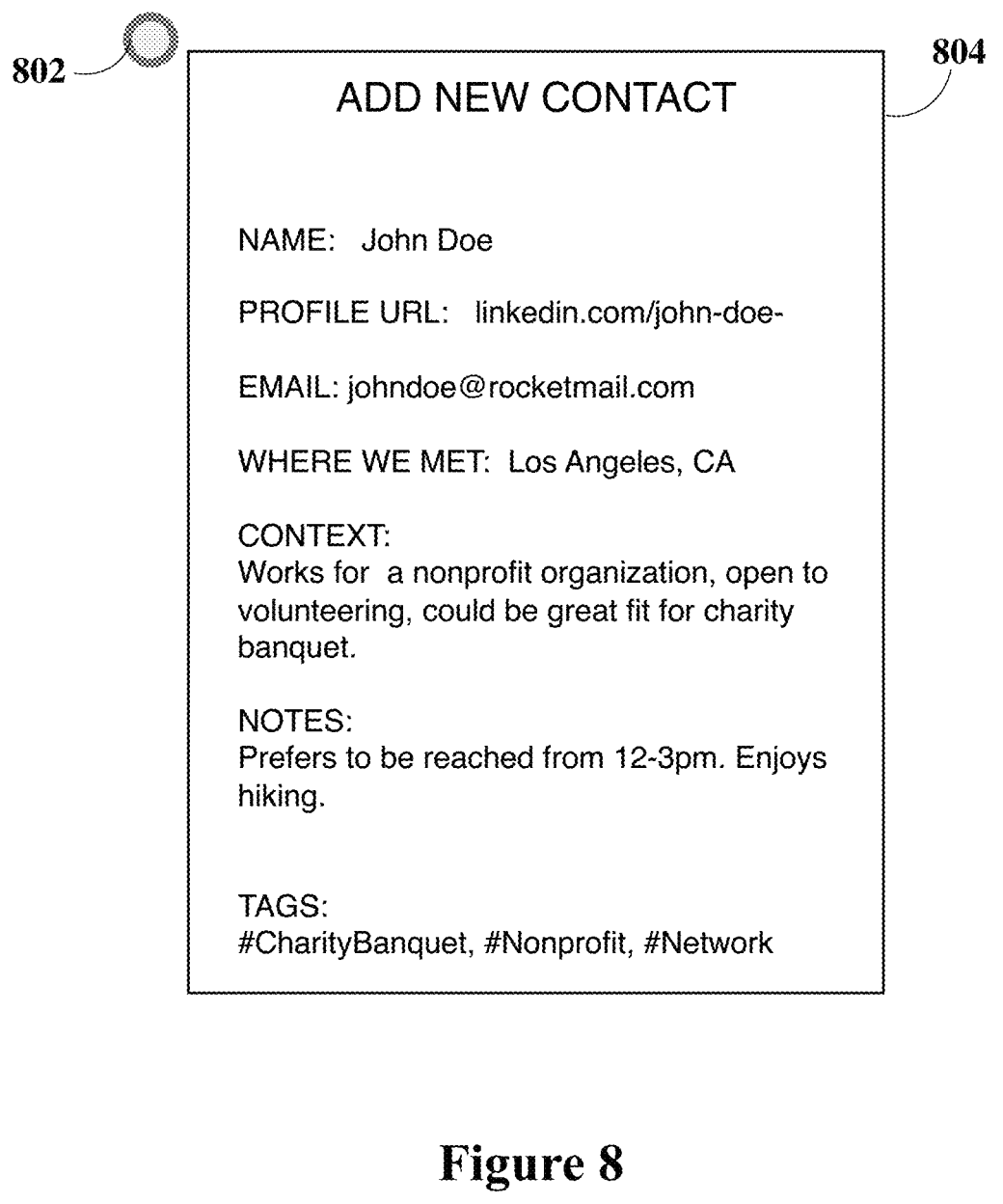

802

804

ADD NEW CONTACT

NAME:  John Doe

PROFILE URL:  linkedin.com/john-doe-

EMAIL: johndoe@rocketmail.com

WHERE WE MET:  Los Angeles, CA

CONTEXT:
Works for  a nonprofit organization, open to
volunteering, could be great fit for charity
banquet.

NOTES:
Prefers to be reached from 12-3pm. Enjoys
hiking.

TAGS:
CharityBanquet, #Nonprofit, #Network

Figure 8

SYSTEM AND METHOD FOR CONTACT MANAGEMENT

CROSS REFERENCE TO RELATED APPLICATIONS

This application claims the benefit of U.S. Provisional Application Ser. No. 63/412,340 filed Sep. 30, 2022, the contents of which are incorporated herein.

FIELD OF THE INVENTION

This invention relates to a system and method for contact management.

BACKGROUND OF THE INVENTION

Social media platforms have allowed individuals to connect one another while also providing a digital footprint of all data they choose to disclose. People on these social platforms have the ability to personalize their profiles to relay information about themselves and their backgrounds to connect with one another more efficiently.

Social networking platforms tend to evolve based off shared experiences, interests and other commonalities, such as attending the same schools or events, or by working alongside one another at a variety of events and organizations. In order to efficiently communicate, it is imperative that there is a more structured way of approaching interactions and ensure that they are more personalized. With millions of people using social platforms, it can be difficult to keep track of every individual one might come across, as well as any details one might want to recall about them, which can be quite burdensome. People might resort to scouring through dozens of pages, contact lists spread across multiple platforms and phones and websites alone just to recall these details, which ends up taking more time than necessary and is highly disorganized and ineffectual.

The present invention seeks to remedy that obstacle by creating an accessible icon that can relay such information, such as a cross-functional contact book that expands across all websites, allowing individuals to input pertinent information, notes, and tags. Advantageous to both employers and individuals who wish to connect in a more personalized way, as well as neurodivergent individuals who would benefit from having such information accessible, the present invention creates an ecosystem and database that is wholly customized by the user to showcase information and notes they deem relevant.

Some relevant information a user might want to include is a contact's name, their social media and networking platform links, emails, numbers, where they met their contact, and some context behind their interactions and intentions with said contact. Additionally, users have the ability to endorse people based off those interactions and provide details regarding target skills.

This system and method allow individuals to filter through a series of characteristics and can be beneficial for those who are looking to recruit or organize for an array of jobs or activities or simply for those who wish to communicate in a more personalized manner.

The prescription manifests in the form of a web extension, which operates within any compatible, extension enabling browser.

SUMMARY OF INVENTION

The present invention provides a system and method for cross-platform annotations, which manifest in a minuscule icon that attaches to photo documents, by way of example and not by way of limitation, social media files, such as profile pictures, headers, and social networking profiles. When a user clicks on an icon that is attached to another user's profile or picture, they can input all information they deem relevant and add that individual to a digital contact book through an extension. For example, a user might input a contact's name, their social media and networking platform links, emails, numbers, where they met them, and some context behind their interactions and intentions with said contact. The extension then allows the user to sort and classify other individuals based off relevance or their desired qualifications. Users can also create specific tags for each individual or contact in order to find them more easily and engage with other users by way of features such as, but not limited to, direct messaging and calendar syncing.

Moreover, users can create tags that specify where a person is known, for example, "High School"-therefore identifying someone as a former classmate, or "Family", which identifies that individual as a relative. Users have the ability to search people based off category and have the option of scanning a contact's business card and relevant files to help further contextualize interaction with a client.

When a user searches a tagged key term, everyone with the associated tag will show up. Another significant example of this tagging feature manifests in a professional atmosphere. Recruiters or companies seeking potential connections would be able to sift through characteristics in a database that correspond with a set of notes they associated with each profile picture or icon. Individuals would then filter key words such as, for example, "Cornell" in order to find Cornell alumni, or "Latin Honors" to find those who graduated with Latin honors at their alma matter. Users may also rank their contacts in accordance to importance. For example, an individual might want to create a list of potential interviewees for a job opportunity. They can then rank these individuals based on the tags or desired qualifications.

Users can also create groups for specific events and opportunities. If a user is seeking to organize an event, they may wish to select contacts who have a background with the event's purpose. A user can then filter and rank potential volunteers or collaborators based off characteristics, job histories, or academic backgrounds. The ranking system allows a user to rank the importance of a contact based off how helpful they can be. For example, if a user wishes to host a charity gala on behalf of endangered species, they might choose to create a group entitled, "Charity Banquet Contact Master list" which will allow them to add individuals who might be fit for the opportunity. A user can use the smart tags and searches such as, "Volunteer", "Animal Rights" or "Activism" and select potential contacts or use their own ranking system to establish a faction of colleagues and clientele.

The system may present a feature that analyzes all noted data and information and can help assist in providing an analysis of notes so that a user can organize them with maximum efficiency. For example, in one embodiment, the system may provide a section for analytics that may display how many users total appear in said tag, as well as a percentage of tags they fulfill. This may also allow them to endorse contacts based off their skills, for example—if one contact has exceptional skills in Adobe suite, or in Microsoft applications, users can rate their satisfaction and endorse them for other employers.

Another facet of the present disclosure is a database of all contacts. A user can click on the extension's main logo and open up a database of their contacts. These contacts can be searched for by name or tag, or scrolled through. The interface will allow them to log out or add a new contact. In the instance a user clicks on a name, all notes regarding the contact will show up, such as their name, contact information, place of meeting, contexts, notes, etcetera.

There will also be an option to sync calendars so that contacts can create engagements across their desired feeds. There may also be follow up reminders for contacts that users have recently met up for, thereby encouraging a steady stream of interactions in order to build strong relationships. Push notifications are enabled to encourage more interactions among users, and to ensure that contacts can partake in effective communication and follow through with their appointments. For example, a notification might deliver to users to follow up on a previous interaction, or to respond to a contact.

For follow up meetings, the system might ask a user a series of questions regarding their forthcoming meeting utilizing the data from their profile. By way of example, and not by way of limitation, it may ask what the purpose of the meeting is and provide a set of talking points that may be useful using key tags, or how prepared a user feels. In summation, the reminder and calendar syncing functionality ensures that users are prepared for meetings and may provide a set of notes and talking points for more effective communication. It also, additionally, gives users the opportunity to rank their interactions after and attach new notes, documents, or data to a contact's profile after.

Furthermore, users will also be able to see the date of last contact and push notifications or nudges to establish a date of next contact. This element will allow those listen to maintain contact with one another, which is essential for networking. Frequency in communication may also encourage users to rank peers and contacts in order of importance. For example, a contact who checks in frequently and has communicated with the user several times in the last 6 months might be ranked higher among others in the contact book. This is especially useful for those who want to be able to better visualize those they come across, such as recruiters.

The invention operates using a processing device and utilizes random access memory or any compatible memory component in order to maintain data operations through a web service platform. While an embodiment of the invention presents itself as an extension, other embodiments such as browsers, a programmable software with a dedicated interface, and programs as a whole are implemented.

While in one embodiment, the present invention might automatically rank contacts based off frequency of contact, users may also manually rank contacts based off the use or value of a contact in their pursuits. For a philanthropist who utilizes the platform primarily for organizing, they may be inclined to rank those with a strong background in philanthropy and charity work above other contacts. For users manually ranking, they may be able to provide a paragraph detailing a contact's skillset.

Other aspect of the preferred embodiment are audio descriptions. These can be especially helpful for those who have visual impairments or fatigues. These audio descriptions may also assist with the pronunciation of contact names.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein:

FIG. 8 is a depiction of both an exemplary icon and a new contact.

DETAILED DESCRIPTION OF THE PREFERRED EMBODIMENT

Figure 1:
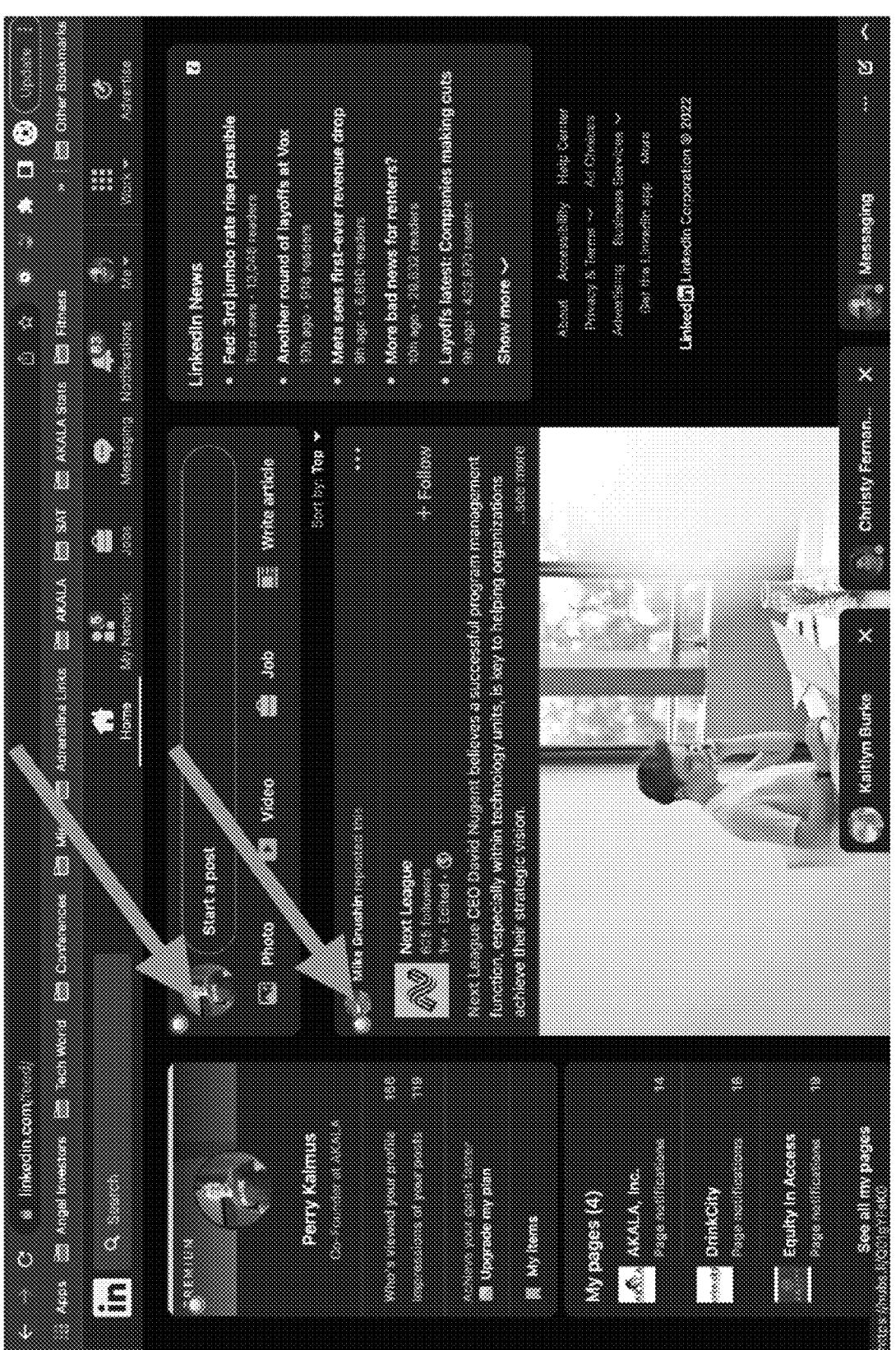
FIG. 1 is an overview of the present invention's icon, which appears on a contact's profile picture and page.

FIG. 1 showcases the icon attached to various profiles, which upon clicking, will disclose all notes and annotations attached to that person's profile. Some examples of this include a contact's name, description, where said contact was met, notes, contexts, and the associated tags.

Figure 2:
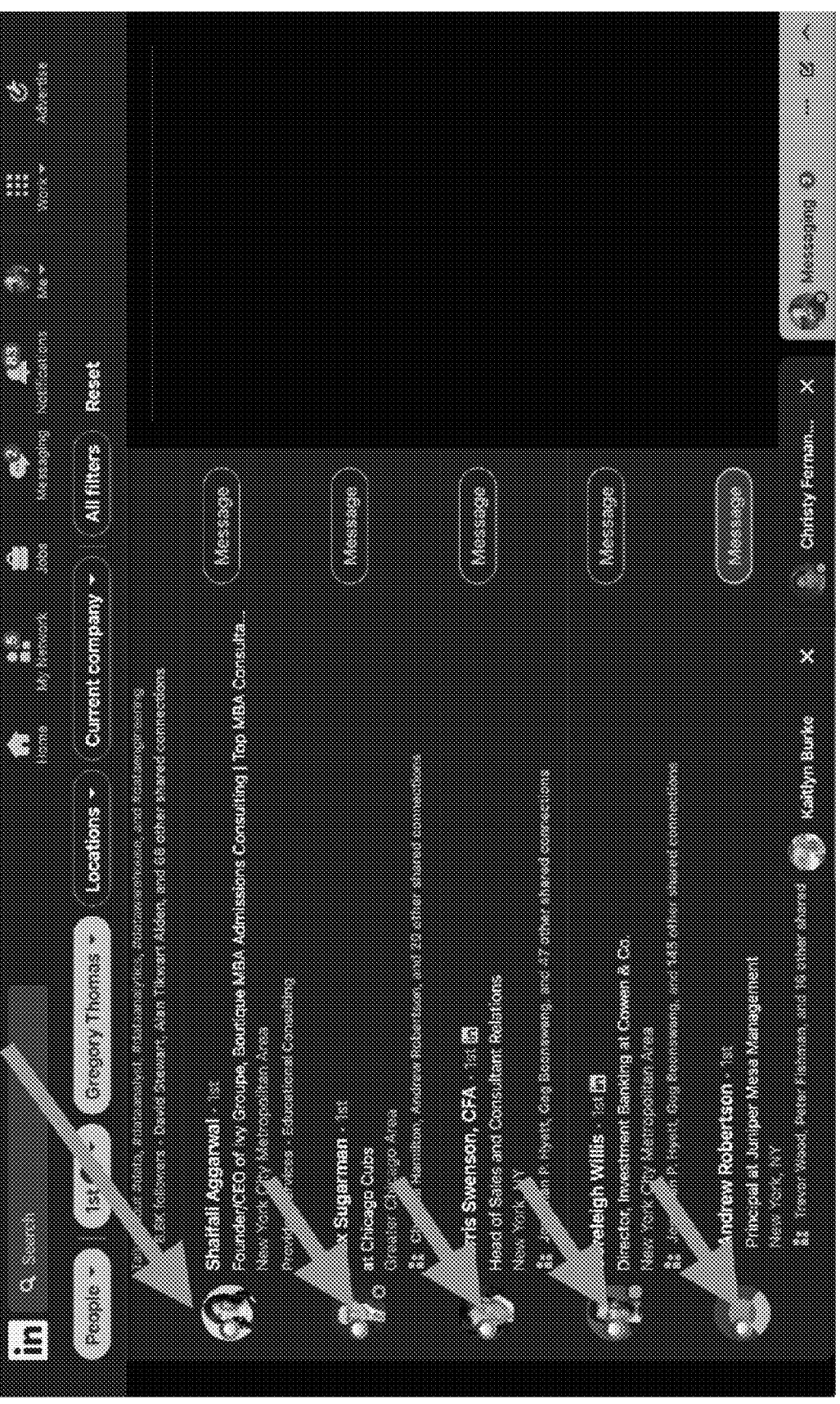
FIG. 2 is another overview of the note's icon on each contact's profile picture.

FIG. 2 depicts another overview of each icon that attaches to each contact's name in lists, allowing easy access of all pertinent information from a wide array of contacts. These dots are clickable and disclose all notes and annotations.

Figure 3:
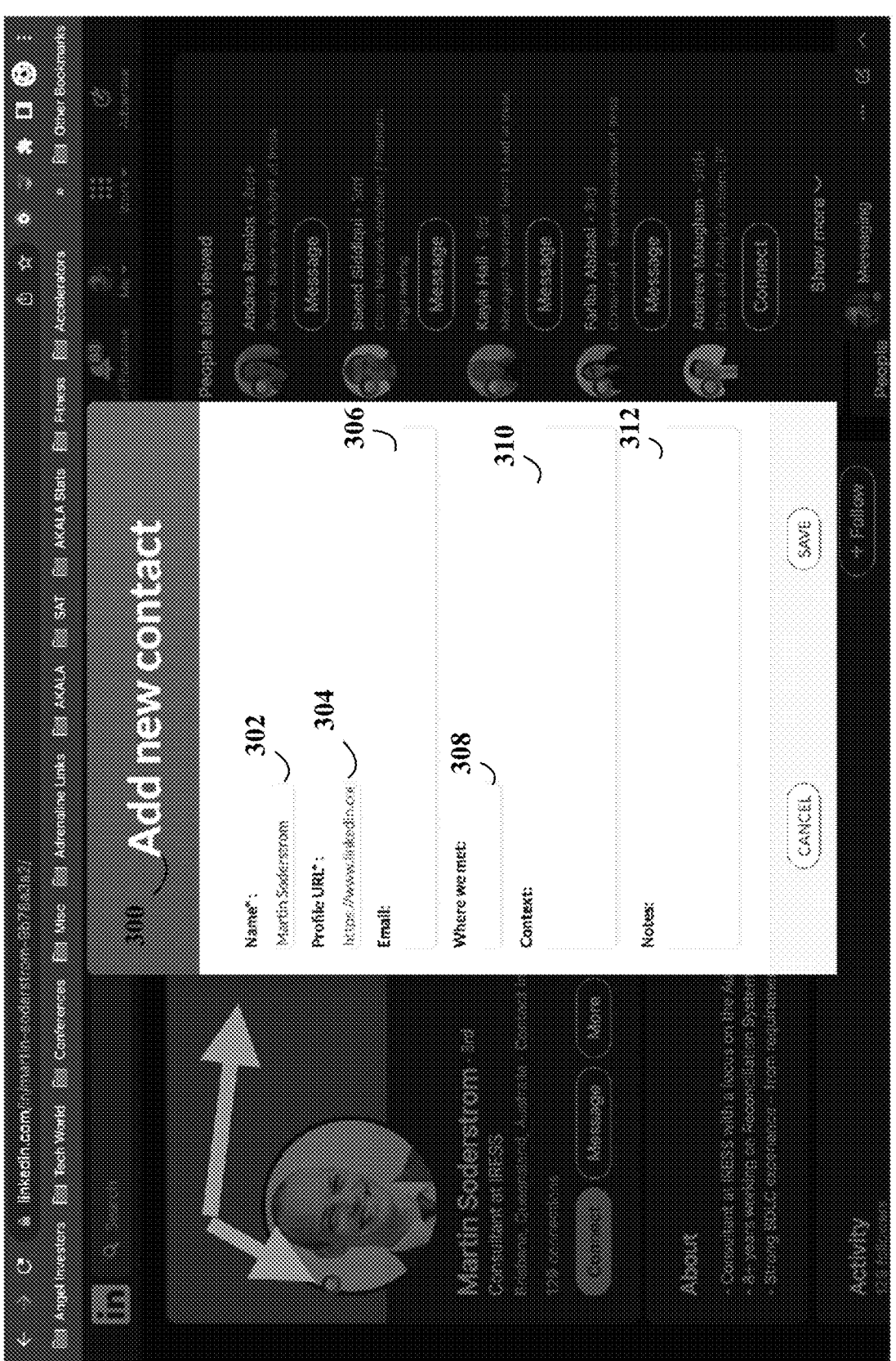
FIG. 3 is an overview of the way a user can add a new contact, as well as the pop up that allows a user to input information.

FIG. 3 showcases how one can add a new contact 300 after clicking on the link, as represented by the green arrows.

This enables a user to add a contact's name 302, profile URL 304, e-mail 306, where they met 308, context 310 and notes 312 for these interactions.

Figure 4:
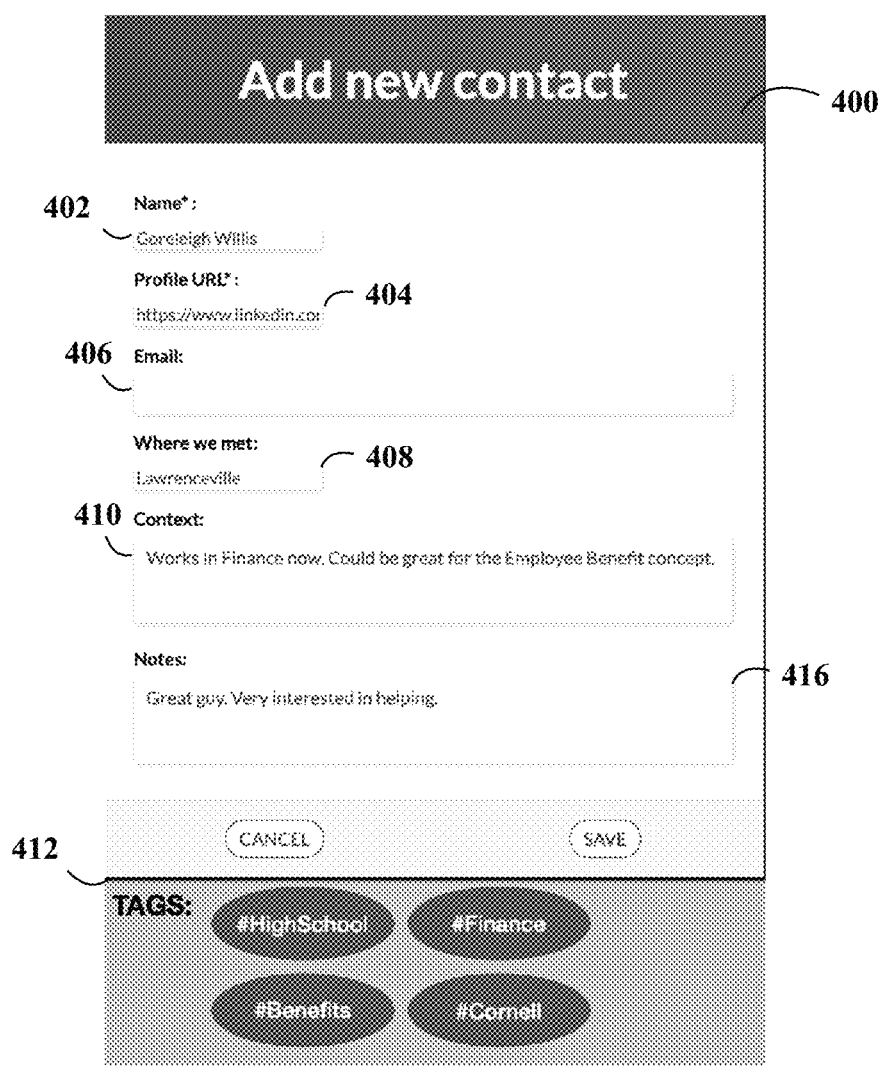
FIG. 4 is an overview of how a user may input information for a new contact.

FIG. 4 shows a broader overview of the add new contact 400 function, where users can input a name 402, a profile URL 404, an email 406, where said contact was met 408, context 410, notes 416, and tags 412. These tags 412 allow users to distinguish other users from one another with more specificity, and also allows users to filter through tags to find a set of individuals who correspond with those categorical tags. Context 410 is especially useful for those who are utilizing the system to make and monitor notes for potential client matters or customer relationship management (CRM).

Figure 5:
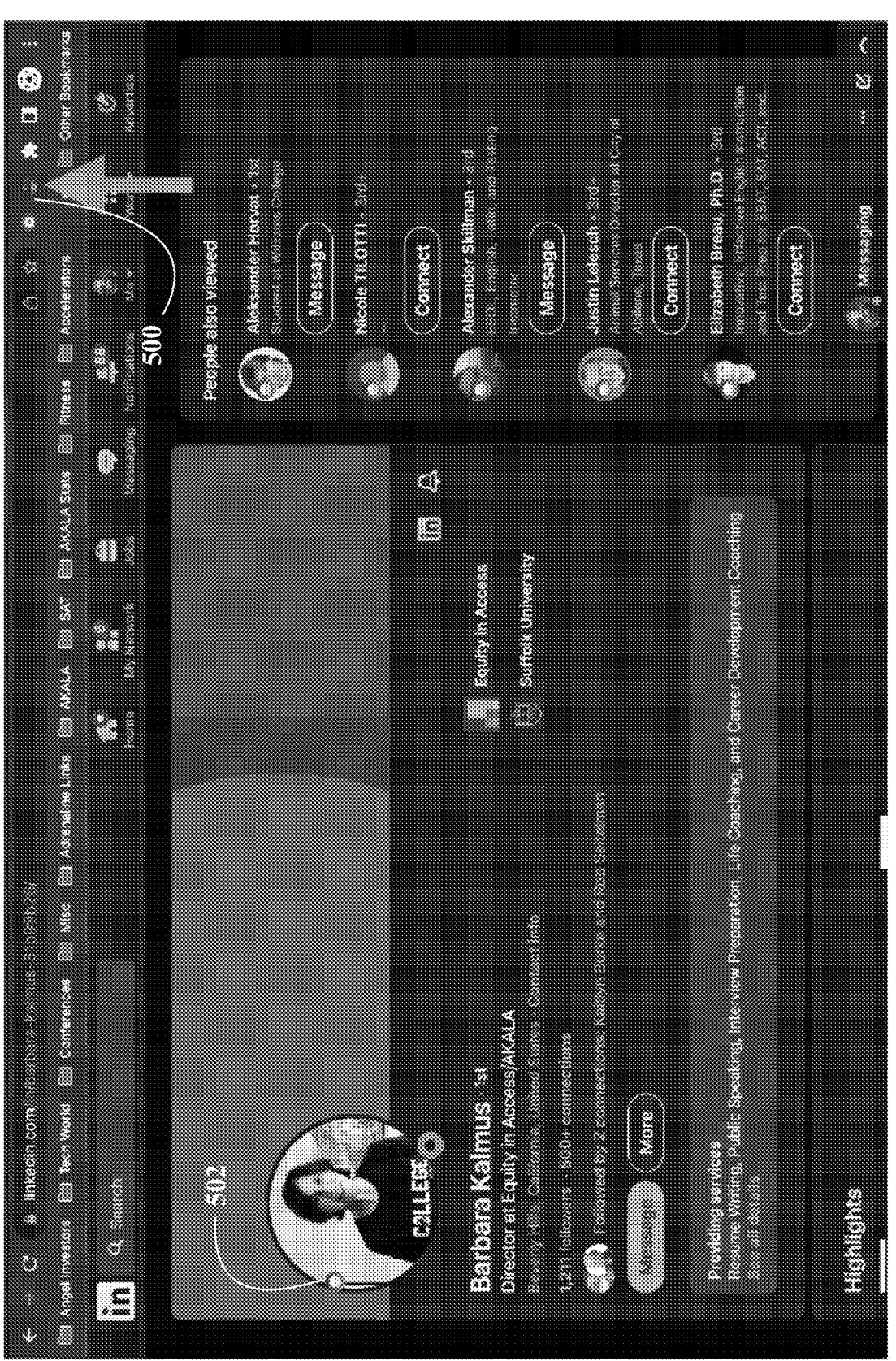
FIG. 5 exhibits the extension logo which appears on menu and tool bars.

FIG. 5 depicts an icon 500 next to the web address bar, which is situated within the tool bar. The icon 500 allows people to see an advanced overview of their contacts 502 with a search bar for more accessibility. These searches may be ranked in order of importance or however the user desires, for example, according to a set of tags.

Figure 6:
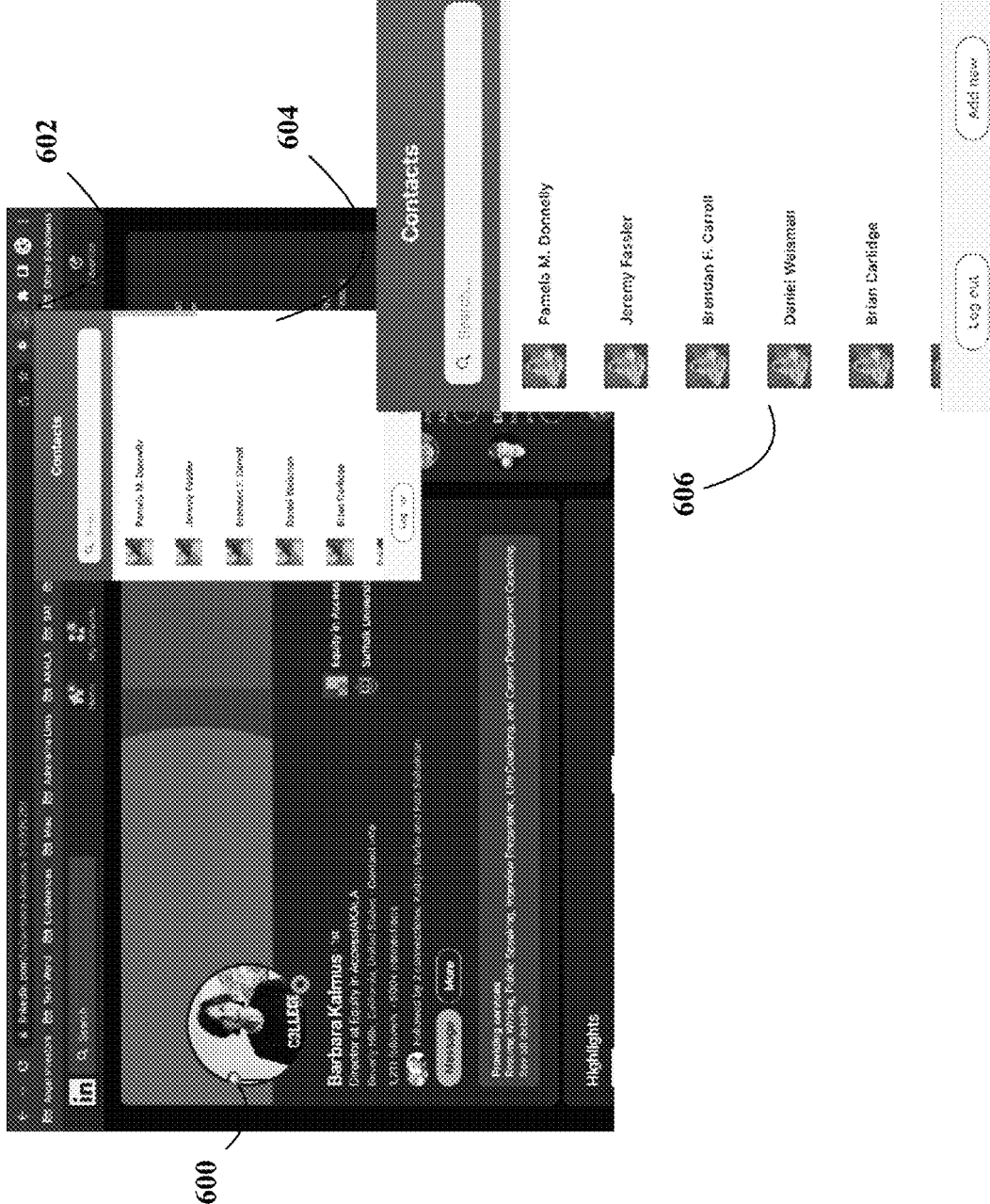
FIG. 6 is an overview of an exemplary contact list, which features a search bar.

FIG. 6 provides an overview of the contact icon 602 attached to a profile photo 600, as well as the in-browser search bar 602 that allow users to scour through contacts 604, as well as a larger overview of an exemplary contact list 606.

Figure 7:
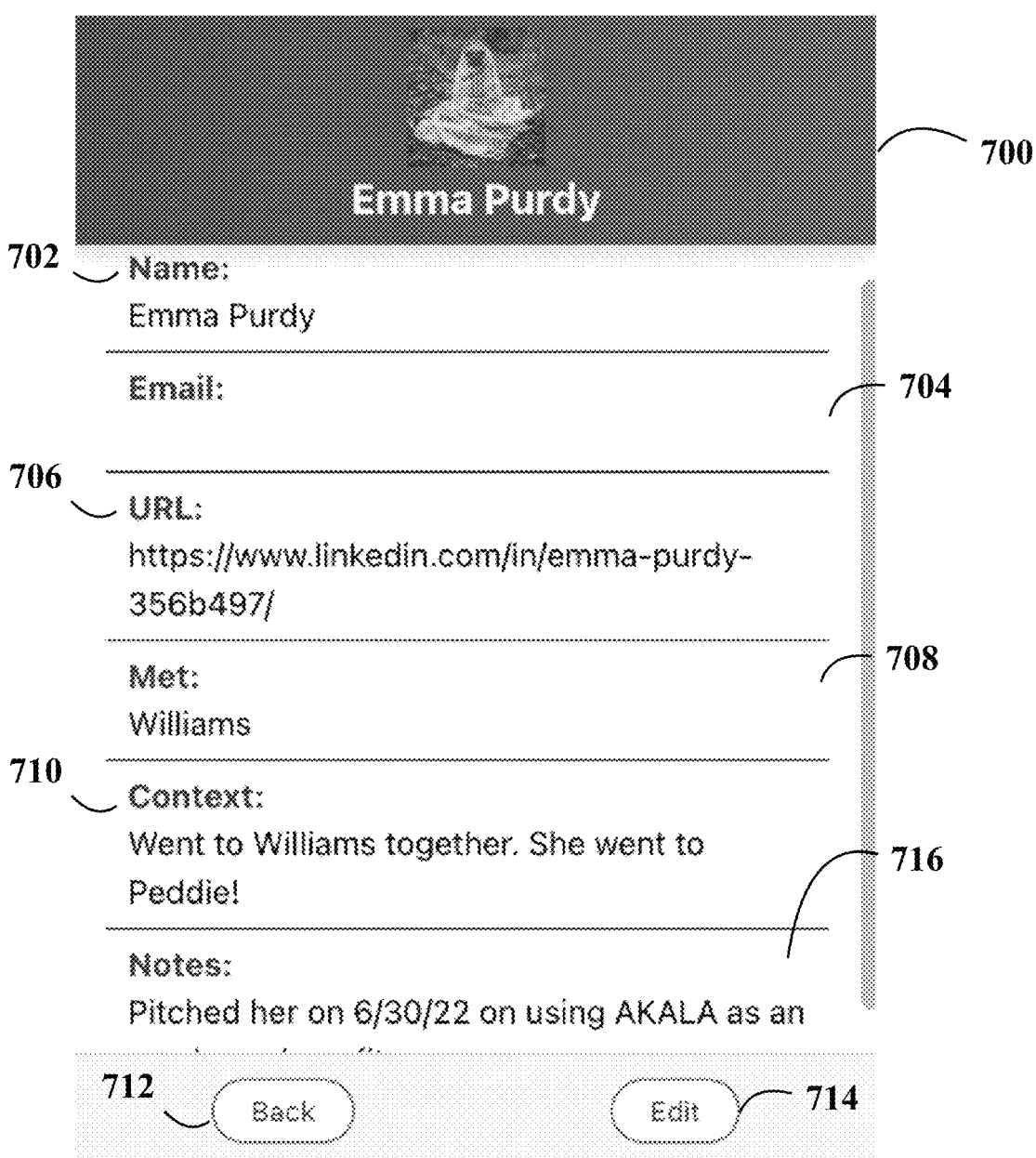
FIG. 7 is a more in-depth overview of the contact page.

FIG. 7 is a depiction of a contact profile 700 that may be edited 714, as well as a back button 712 that allows users to return to the main list of contact. Each contact profile 700 includes sections for the name 702, email 704 and additional contact information, social media or website URL 706, where the contact was met 708 should they choose to utilize that description setting, context 710, and notes 716. These notes can, by way of example and not by way of limitation, include when they last pitched, or when they plan on interviewing a potential employee.

FIG. 8 is the present invention's icon 802 and the add new contact functionality 804. When a user clicks on the icon 802, they are then allowed to add a new contact or view the already inputted data regarding that contact within the contact card 804, page, pop up, note, etc.

Figure 9:
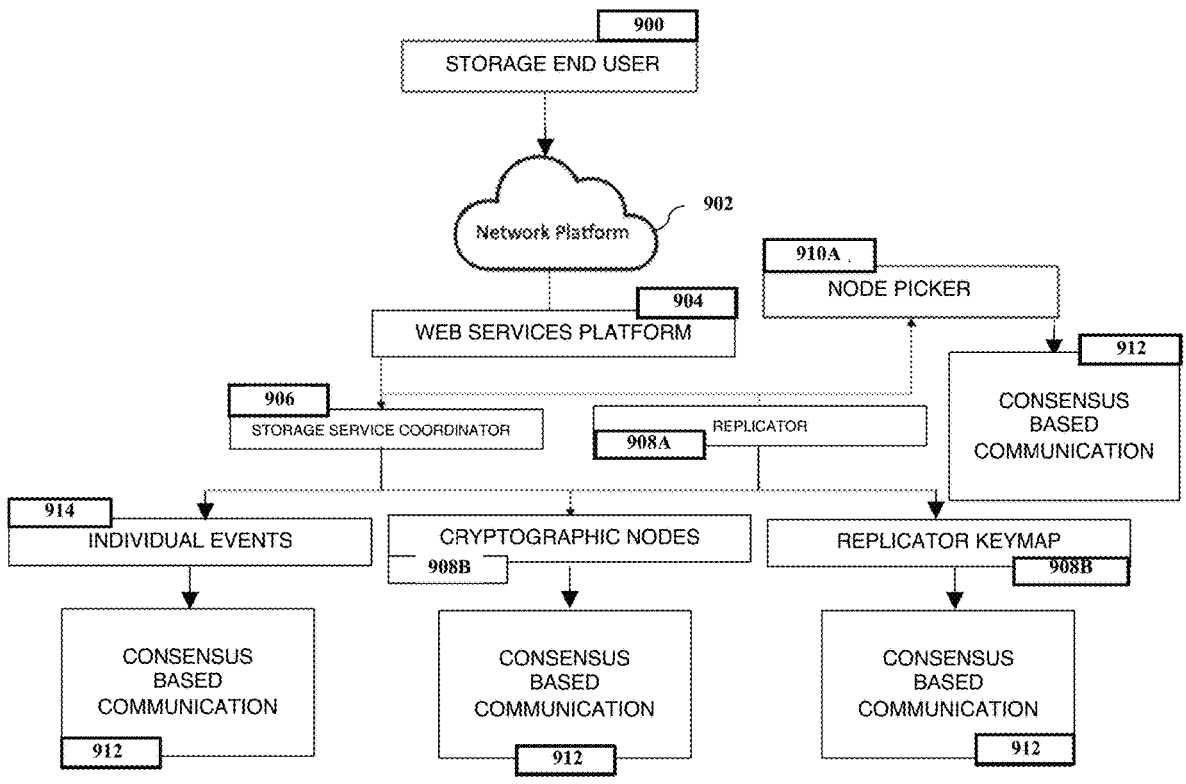
FIG. 9 is a diagram depicting the platform's web service infrastructure.

FIG. 9 is a diagram showing the communication between the storage end user 900, the network platform 902 and the various elements that help effectuate operations. The storage end user 900 communicates and relays various pertinent bits of data to the network platform 902. The network platform 902 operates on the web service platform 904, which features a storage service coordinator 906 and replicator 908A. Each of these services utilize a node picker 910A which helps establish consensus-based communication 912. The storage service coordinator 906 maintains and records individual events 914 and cryptographic nodes 908B, or keys that are used for operations. The replicator has its own keymap 908B which generates consensus-based communication 912, alongside the cryptographic nodes 908B and individual events 914.

Figure 10:
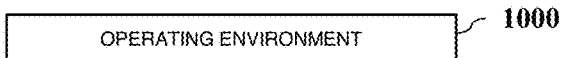
FIG. 10 is a depiction of the platform's web services, as well as the components of an exemplary operating environment in which embodiments of the present invention may be implemented.
Figure 10:
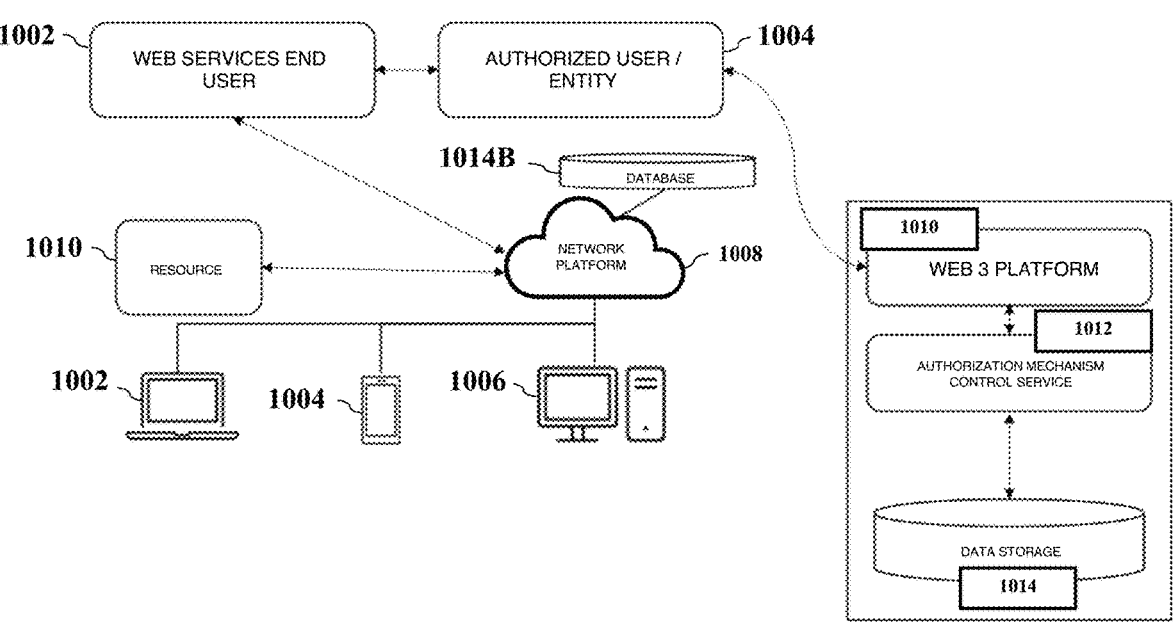

FIG. 10 is a diagram showing the web services of the platform and system. The platform and system are all components of an exemplary operating environment 1000 in which embodiments of the present invention may be implemented. The system can include one or more user computers, computing devices, or processing devices which can be used to operate a client, such as a dedicated application, web browser, etc. The user computers can be general purpose personal computers 1002 (including, merely by way of example, personal computers and/or laptop computers running a standard operating system), cell phones or PDAs 1004 (running mobile software and being Internet, e-mail, SMS, Blackberry, or other communication protocol enabled), and/or workstation computers 1006 running any of a variety of commercially-available UNIX or UNIX-like operating systems (including without limitation, the variety of GNU/Linux operating systems). These user computers may also have any of a variety of applications, including one or more development systems, database client and/or server applications, and Web browser applications. Alternatively, the user computers may be any other electronic device, such as a thin-client computer, Internet-enabled gaming system, and/or personal messaging device, capable of communicating via a network (e.g., the network described below) and/or displaying and navigating Web pages or other types of electronic documents. Although the exemplary system is shown with four user computers, any number of user computers may be supported.

In most embodiments, the system includes some type of network. The network can be any type of network familiar to those skilled in the art that can support data communications using any of a variety of commercially-available protocols, including without limitation TCP/IP, SNA, IPX, AppleTalk, and the like. Merely by way of example, the network can be a local area network ("LAN"), such as an Ethernet network, a Token-Ring network and/or the like; a wide-area network, including without limitation a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, WiMAX, WiFi, CDMA 2000, WCDMA, the Bluetooth protocol known in the art, and/or any other wireless protocol); and/or any combination of these and/or other networks.

The system may also include one or more server computers which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers may be dedicated to running applications, such as a business application, a Web server, application server, etc. Such servers may be used to process requests from user computers. The applications can also include any number of applications for controlling access to resources 1010 of the servers.

The web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers. As one example, a server may execute one or more Web applications. The Web application may be implemented as one or more scripts or programs written in any programming language, such as Java®, C, C#, or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer. The generation of notes occurs by programming a code to operate front and back end. The designated web service helps execute operations pertaining to data entry storage so that a user could cross-reference their notes on various browsers without the need for manually adding an extension. The web service platform helps effectuate operations by running scripts and encrypting data so that it could be safely referenced on various devices without the need to sync them. The program allows a user to take notes and configure them to the web service. Moreover, operating on a web service and network platform 1008 helps create customizable tags that can be accessed not only through a primary platform but secondary ones as well.

End users, or users that are viewing and using the network platform 1008, all contribute data to the cloud. A web service platform helps secure that data and maintain the service's functionalities. Only authorized users and entities 1004 can authorize or unauthorize content and monitor data stored within the web service. The platform's web services help maintain the operations of elements managed by the storage system.

The system may also include one or more databases 1014B. The database(s) 1014B may reside in a variety of locations. By way of example, a database 1014B may reside on a storage medium local to (and/or resident in) one or more of the computers. Alternatively, it may be remote from any or all of the computers, and/or in communication (e.g., via the network) with one or more of these. In a particular set of embodiments, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational data-base, such as Oracle 10g, that is adapted to store, update, and retrieve data in response to SQL-formatted commands.

The infrastructure of the present invention also allows for the use of web services 1002 that enable interaction with and storage of data across devices. Specifically, these web services 1002 can allow for the use of cloud software tools and cloud-based data storage 1014. Cloud software tools can be used to allow for increased user authentication and authorization checkpoints 1012 for data accessed between parties. The web 3 platform 1010 service software aids in the transmission of data between entities while still maintaining secure access restrictions preventing any unauthorized access to the cloud data.

Figure 11:
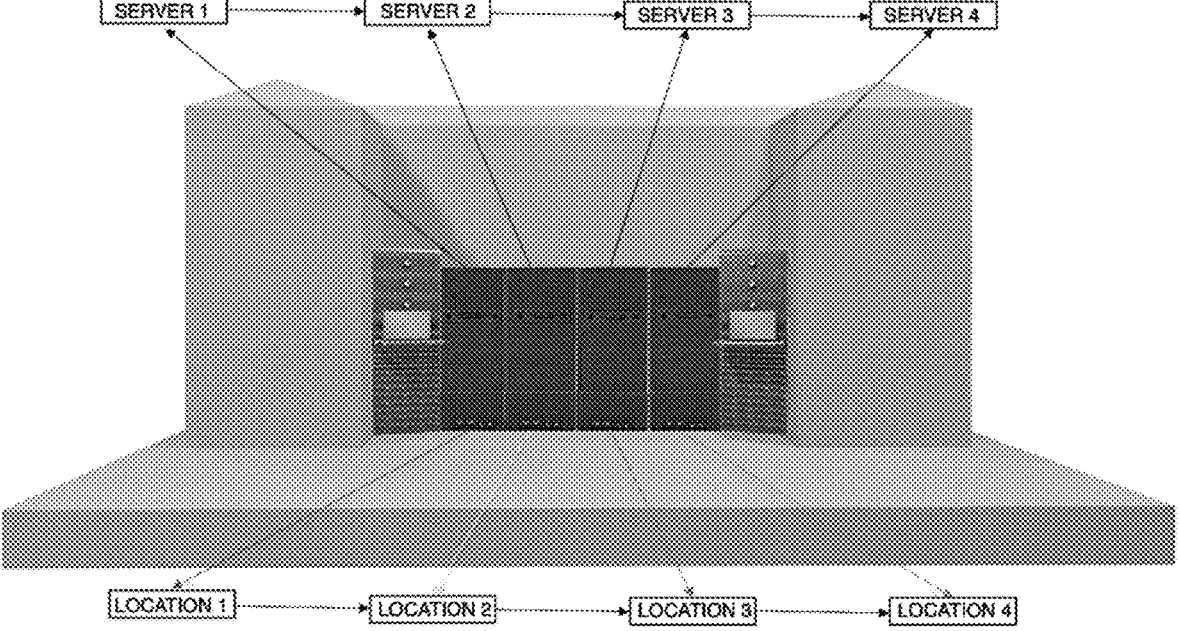
FIG. 11 is an illustration of a multi-server room and the various locations in which other pertinent server rooms may exist.

FIG. 11 is an illustration of server-to-server connections, within a server room and to other sever room locations. The web server undergoes an initialization process and features a database of wireless network data. Dependent on the service requested, the data may undergo processing, and be displayed in a manner that may be customized by the end user. The servers actively attempt to retrieve the appropriate data to provide user input. Data may then be formatted, and with the appropriate authorizations, saved or restructured, typically in the form of tags that can be referenced.

Figure 12:
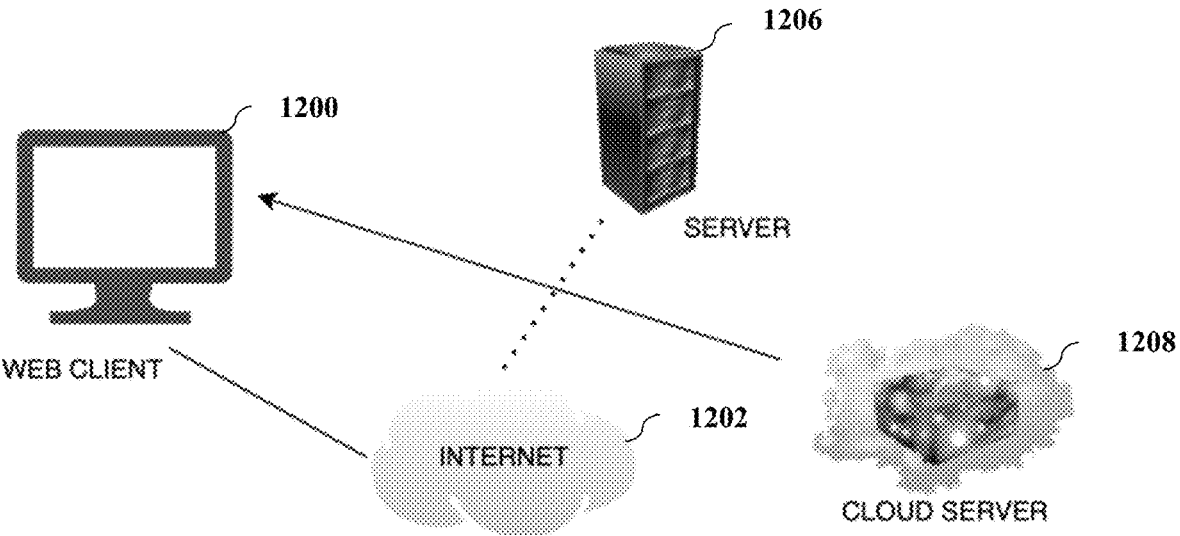
FIG. 12 is a diagram disclosing the relationship between the cloud server, a computing device with a central processing unit operated by a client, the internet, and a server.

FIG. 12 is a diagram disclosing the relationship between the cloud server 1208, a computing device with a central processing unit operated by a client 1200, the internet 1202, and a server 1206. In accordance with the preferred embodiment, a web client 1200 interacts with the server ecosystem by way of a service connection, such as the internet 1202, which then distributes data and pertinent information such as the web service platform to the cloud server 1208 and preliminary servers 1206. This allows for data to be streamlined between the client and the server as well as cloud servers 1208 and other database systems. Communication between web services may be completed via Simple Object Access Protocol (SOAP) which allows multiple web service applications to communicate rapidly and efficiently and to provide data to the web client. The processing device, typically in a mobile device, can enable shortcut customizations for notes on various websites if access is permitted and toggled.

Figure 13:
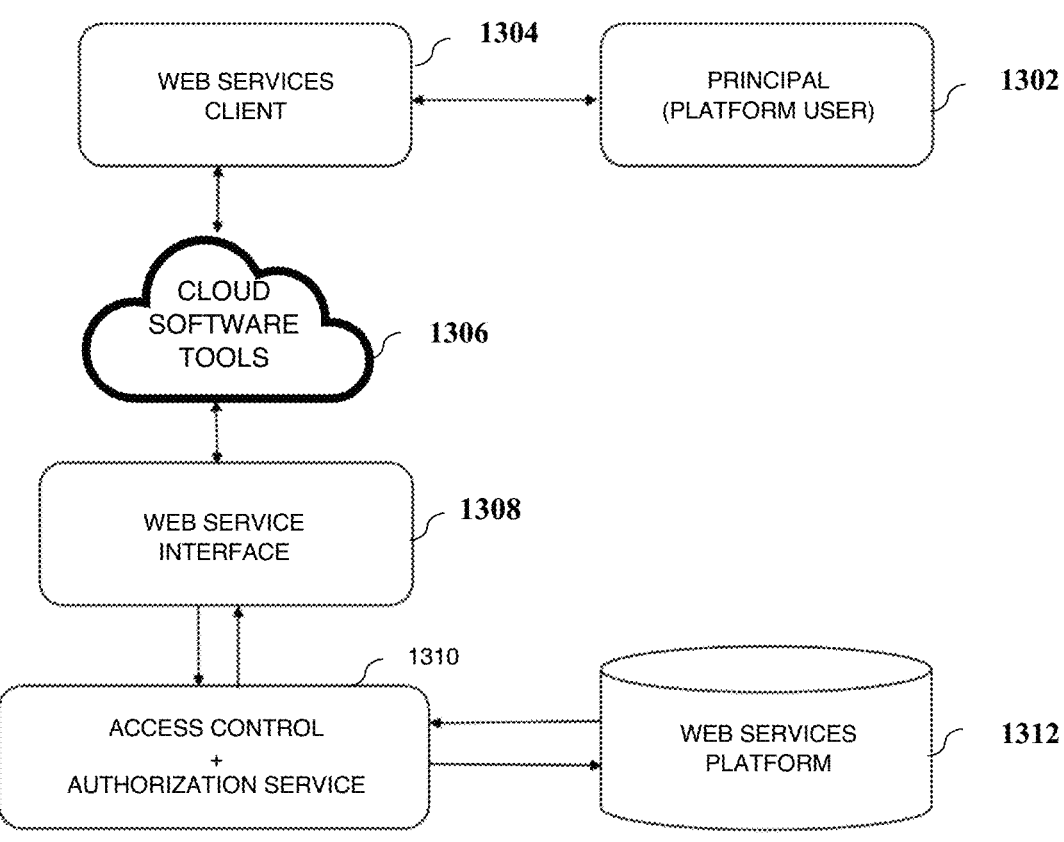
FIG. 13 is a diagram of the flow of access between the platform of the present invention and the web services client via cloud software tools.

FIG. 13 is a diagram of the flow of access between the platform 1302 of the present invention and the web services client 1304 via cloud software tools 1306. The principal or platform user 1302 accesses the web services client 1304, which then transmits data via cloud software tools 1306 to the web services interface 1308. Access control and authorization 1310 acts as a layer in order to access the web services platform 1312 by way of the web services interface.

Figure 14:
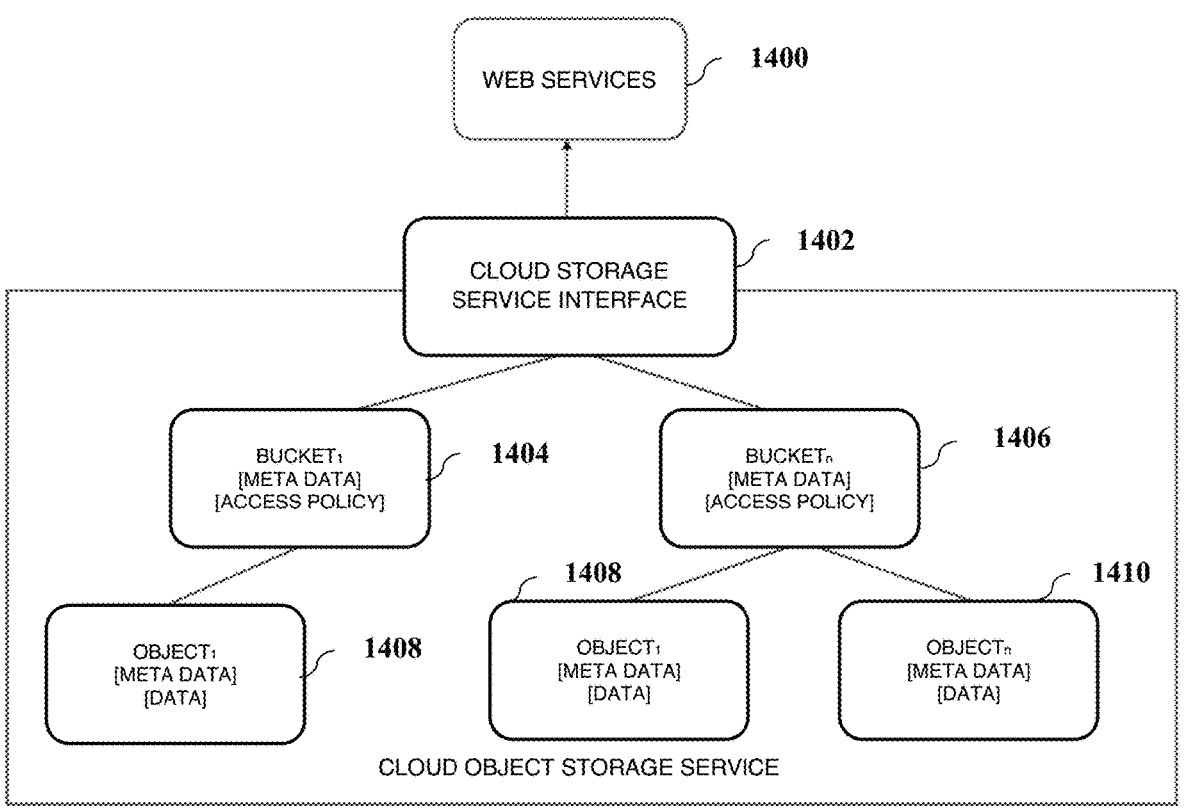
FIG. 14 is a diagram of an example of the cloud storage organization in which the web services accesses and retrieves user data as objects in buckets within a cloud storage space.

FIG. 14 is a diagram of an example of the cloud storage organization in which the web services accesses 1400 and retrieves user data as objects in buckets within a cloud storage space 1402. The cloud storage service 1402 is a means of storing and protecting any amount of data for a range of use cases. A bucket 1404 is a container 1406 for objects stored in the cloud storage service 1402, and objects 1410 consist of object data and metadata 1408. The metadata 1408 is a set of name-value pairs that describe the object. These pairs include some default metadata, such as the date last modified, and standard HTTP metadata, such as Content-Type. You can also specify custom metadata at the time that the object is stored. Web services provide access to and from the cloud object storage service via the cloud storage service interface.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for contact management, the system comprising of:

a processing device, configured to receive directions using computer-readable code;

a memory unit for storing and maintaining data through a web service platform, and wherein said web service platform operates an organization platform for webpage notes;

a notes module, executed by way of said computer-readable code, for inputting and storing a user's notes and multimedia and displaying said notes according to an identifiable title associated with a cross-browser contact book, wherein said cross-browser contact book features information regarding said contact, including email and phone number; and a clickable icon, positioned above a desired piece of said multimedia, wherein said clickable icon is provided by a browser extension and manifests as an overlay on a third-party website displayed within a browser, the overlay attaching to social media files of said website, configured to present and display said notes module, and wherein said contact book is displayed on an online browser by way of said clickable icon operating over said web service;

wherein said notes module further enables a user to assign rankings or priority levels to contacts based on user-defined criteria; and wherein said web service platform maintains said notes and contact annotations in a cloud storage system that provides cross-device continuity without manual synchronization.

2. The system according to claim 1, wherein said notes module features enables a user to create tagged content.

3. The system according to claim 2, further comprising of said tagged content being searchable by way of a search bar inside said notes module.

4. The system according to claim 1, wherein said notes module features a section for providing contexts for a user's association with said cross-browser contact book contact.

5. The system according to claim 1, wherein said notes module is used for networking use and personal use.

6. The system according to claim 1, wherein said web service platform retrieves notes data as objects within a cloud storage space.

7. A method for contact management, the method comprising of:

configuring a processing device to receive directions using computer-readable code;

storing and maintain data through a web service platform on said processing device;

operating a contact organization system on said web service platform by way of webpage notes;

inputting and storing a user's notes on said contact organization system operating on said web service platform, and wherein said notes include contact details and multimedia;

displaying said notes a notes module and displaying said notes according to an identifiable title associated with a cross-browser contact book, wherein said cross-browser contact book features information regarding said contact, including their email and phone number; and positioning a clickable icon over a desired piece of said multimedia, wherein said clickable icon is provided by a browser extension and manifests as an overlay on a third-party website displayed within a browser, the overlay attaching to social media files of said website, to present and display said contact organization system through a contact book module, and wherein said contact book module is presented using an online browser operating over said web service; enabling a user to assign rankings or priority levels to contacts based on user-defined criteria; and maintaining said notes and contact annotations in a cloud storage system that provides cross-device continuity without manual synchronization.

8. The method according to claim 7, wherein said notes module features enables a user to create tagged content.

9. The method according to claim 8, further comprising of said tagged content being searchable by way of a search bar inside said notes module.

10. The method according to claim 7, wherein said notes module features a section for providing contexts for a user's association with said cross-browser contact book contact.

11. The method according to claim 7, wherein said notes module is used for networking use and personal use.

12. The method according to claim 7, wherein said web service platform retrieves notes data as objects within a cloud storage space.

* * * * *